United States Patent
Kurian et al.

(10) Patent No.: US 9,206,346 B2
(45) Date of Patent: Dec. 8, 2015

(54) COMPOSITIONS AND METHODS FOR DIVERTING INJECTED FLUIDS TO ACHIEVE IMPROVED HYDROCARBON FLUID RECOVERY

(71) Applicant: NALCO COMPANY, Naperville, IL (US)

(72) Inventors: Pious V. Kurian, Aurora, IL (US); Kin-Tai Chang, Sugar Land, TX (US); Manian Ramesh, Barrington, IL (US); Olga E. Shmakova-Lindeman, Brookfield, WI (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 14/543,417

(22) Filed: Nov. 17, 2014

(65) Prior Publication Data

US 2015/0068748 A1    Mar. 12, 2015

Related U.S. Application Data

(62) Division of application No. 12/424,244, filed on Apr. 15, 2009, now Pat. No. 8,889,603.

(60) Provisional application No. 61/046,721, filed on Apr. 21, 2008.

(51) Int. Cl.
| | |
|---|---|
| *C09K 8/58* | (2006.01) |
| *C09K 8/516* | (2006.01) |
| *C09K 8/588* | (2006.01) |
| *C09K 8/512* | (2006.01) |
| *E21B 33/138* | (2006.01) |
| *E21B 43/16* | (2006.01) |
| *E21B 43/20* | (2006.01) |

(52) U.S. Cl.
CPC . *C09K 8/58* (2013.01); *C09K 8/512* (2013.01); *C09K 8/516* (2013.01); *C09K 8/588* (2013.01); *E21B 33/138* (2013.01); *E21B 43/164* (2013.01); *E21B 43/20* (2013.01)

(58) Field of Classification Search
None
See application file for complete search history.

(56) References Cited

U.S. PATENT DOCUMENTS

| | | | |
|---|---|---|---|
| 5,465,792 A | 11/1995 | Dawson et al. | |
| 5,701,955 A | 12/1997 | Frampton | |
| 5,735,349 A | 4/1998 | Dawson et al. | |
| 6,454,003 B1 | 9/2002 | Chang et al. | |
| 6,569,983 B1 | 5/2003 | Treybig et al. | |
| 6,729,402 B2 | 5/2004 | Chang et al. | |
| 6,897,256 B1 * | 5/2005 | Dreher et al. | 524/457 |
| 6,984,705 B2 | 1/2006 | Chang et al. | |
| 7,300,973 B2 | 11/2007 | Chang et al. | |
| 2007/0204989 A1 | 9/2007 | Tang | |

FOREIGN PATENT DOCUMENTS

GB    2262117 A    9/1993

OTHER PUBLICATIONS

M. Wang et al., Synthesis of Poly(silyl ester)s via AB Monomer Systems, Macromolecules, 2000, pp. 734-742, 33, American Chemical Society, Published on Web Jan. 13, 2000.

* cited by examiner

*Primary Examiner* — John J Figueroa
(74) *Attorney, Agent, or Firm* — Dorsey & Whitney LLP

(57) ABSTRACT

The present disclosure is directed to compositions and methods that may be used for enhanced oil recovery, for modifying the permeability of subterranean formations and for increasing the mobilization and/or recovery rate of hydrocarbon fluids present in the formations. The compositions may include, for example, expandable cross linked polymeric microparticles having an unexpanded volume average particle size diameter of from about 0.05 to about 5,000 microns and a cross linking agent content of from about 100 to about 200,000 ppm of hydrolytically labile silyl ester or silyl ether crosslinkers and from 0 to about 300 ppm of non-labile crosslinkers.

8 Claims, No Drawings

COMPOSITIONS AND METHODS FOR DIVERTING INJECTED FLUIDS TO ACHIEVE IMPROVED HYDROCARBON FLUID RECOVERY

CROSS REFERENCE TO RELATED APPLICATIONS

This application is a divisional application of U.S. patent application Ser. No. 12/424,244, filed Apr. 15, 2009, which claims benefit of U.S. Provisional Application No. 61/046,721, filed Apr. 21, 2008, the disclosures of which are incorporated herein by reference in their entirety.

BACKGROUND

In the first stage of hydrocarbon recovery the sources of energy present in the reservoir are allowed to move the oil, gas, condensate etc. to the producing wells(s) where they can flow or be pumped to the surface handling facility. A relatively small proportion of the hydrocarbon in place can usually be recovered by this means. The most widely used solution to the problem of maintaining the energy in the reservoir and ensuring that hydrocarbon is driven to the producing well(s) is to inject fluids down adjacent wells. This is commonly known as secondary recovery.

The fluids normally used are water (such as aquifer water, river water, sea water, or produced water), or gas (such as produced gas, carbon dioxide, flue gas and various others). If the fluid encourages movement of normally immobile residual oil or other hydrocarbon, the process is commonly termed tertiary recovery.

A very prevalent problem with secondary and tertiary recovery projects relates to the heterogeneity of the reservoir rock strata. The mobility of the injected fluid is commonly different from the hydrocarbon and when it is more mobile various mobility control processes have been used to make the sweep of the reservoir more uniform and the consequent hydrocarbon recovery more efficient. Such processes have limited value when high permeability zones, commonly called thief zones or streaks, exist within the reservoir rock. The injected fluid has a low resistance route from the injection to the production well. In such cases the injected fluid does not effectively sweep the hydrocarbon fluids from adjacent, lower permeability zones. When the produced fluid is re-used this can lead to fluid cycling through the thief zone to little benefit and at great cost in terms of fuel and maintenance of the pumping system.

Numerous physical and chemical methods have been used to divert injected fluids out of thief zones in or near production and injection wells. When the treatment is applied to a producing well it is usually termed a water (or gas etc.) shut-off treatment. When it is applied to an injection well it is termed a profile control or conformance control treatment.

In cases where the thief zone(s) are isolated from the lower permeability adjacent zones and when the completion in the well forms a good seal with the barrier (such as a shale layer or "stringer") causing the isolation, mechanical seals or "plugs" can be set in the well to block the entrance of the injected fluid. If the fluid enters or leaves the formation from the bottom of the well, cement can also be used to fill up the well bore to above the zone of ingress.

When the completion of the well allows the injected fluid to enter both the thief and the adjacent zones, such as when a casing is cemented against the producing zone and the cement job is poorly accomplished, a cement squeeze is often a suitable means of isolating the watered out zone.

Certain cases are not amenable to such methods by virtue of the facts that communication exists between layers of the reservoir rock outside the reach of cement. Typical examples of this are when fractures or rubble zones or washed out caverns exist behind the casing. In such instances chemical gels, capable of moving through pores in reservoir rock have been applied to seal off the swept out zones.

When such methods fail the only alternatives remaining are to produce the well with poor recovery rate, sidetrack the well away from the prematurely swept zone, or abandon the well. Occasionally the producing well is converted to a fluid injector to increase the field injection rate above the net hydrocarbon extraction rate and increase the pressure in the reservoir. This can lead to improved overall recovery but it is worthy of note that the injected fluid will mostly enter the thief zone at the new injector and is likely to cause similar problems in nearby wells. All of these are expensive options.

Near wellbore conformance control methods always fail when the thief zone is in widespread contact with the adjacent, hydrocarbon containing, lower permeability zones. The reason for this is that the injected fluids can bypass the treatment and re-enter the thief zone having only contacted a very small proportion, or even none of the remaining hydrocarbon. It is commonly known amongst those skilled in the art, that such near wellbore treatments do not succeed in significantly improving recovery in reservoirs having crossflow of the injected fluids between zones.

A few processes have been developed with the aim of reducing the permeability in a substantial proportion of the thief zone and, or at a significant distance from the injection and production wells. One example of this is the Deep Diverting Gel process patented by Morgan et al (1). This has been used in the field and suffered from sensitivity to unavoidable variations in quality of the reagents which resulted in poor propagation. The gelant mixture is a two component formulation and it is believed that this contributed to poor propagation of the treatment into the formation.

The use of swellable cross linked superabsorbent polymer microparticles for modifying the permeability of subterranean formations is disclosed in U.S. Pat. Nos. 5,465,792 and 5,735,349. However, swelling of the superabsorbent microparticles described therein is induced by changes of the carrier fluid from hydrocarbon to aqueous or from water of high salinity to water of low salinity.

Cross linked, expandable polymeric microparticles and their use for modifying the permeability of subterranean formations and increasing the mobilization and/or recovery rate of hydrocarbon fluids present in the formation are disclosed in U.S. Patent Nos. 6,454,003 B1; 6,709,402 B2; 6,984,705 B2 and 7,300,973 B2 and in published U.S. Patent Application No. 2007/0204989 A1.

SUMMARY

We have discovered novel polymeric microparticles in which the microparticle conformation is constrained by hydrolytically labile silyl ether or silyl ester crosslinkers. The microparticle properties, such as particle size distribution and density, of the constrained microparticle are designed to allow efficient propagation through the pore structure of hydrocarbon reservoir matrix rock, such as sandstone. On heating to reservoir temperature and/or at a predetermined pH, the reversible (labile) internal cross links start to break allowing the particle to expand by absorbing the injection fluid (normally water).

The ability of the particle to expand from its original size (at the point of injection) depends only on the presence of conditions that induce the breaking of the silyl ether or silyl ester crosslinkers and other labile crosslinkers present in the microparticles. The particles of this invention can propagate through the porous structure of the reservoir without using a designated fluid or fluid with salinity higher than the reservoir fluid.

The expanded particle is engineered to have a particle size distribution and physical characteristics, for example, particle rheology, which allow it to impede the flow of injected fluid in the pore structure. In doing so it is capable of diverting chase fluid into less thoroughly swept zones of the reservoir.

The rheology and expanded particle size of the particle can be designed to suit the reservoir target, for example by suitable selection of the backbone monomers or comonomer ratio of the polymer, or the degree of reversible (labile) and irreversible cross linking introduced during manufacture.

In an embodiment, this invention is a composition comprising highly cross linked expandable polymeric microparticles having unexpanded volume average particle size diameters of about 0.05 to about 5,000 microns and a cross linking agent content of from 0 to about 300 ppm of non-labile cross linking agent and from about 100 to about 200,000 ppm of labile crosslinking agent, wherein said labile crosslinking agent comprises one or more hydrolytically labile silyl ether or silyl ester crosslinkers, or a mixture thereof.

In alternative embodiments, methods for using the above compositions are also provided.

Additional features and advantages are described herein, and will be apparent from the following Detailed Description.

DETAILED DESCRIPTION

"Acryloxy" means a group of formula $CH_2=CHC(O)O-$. "Methacryloxy" means a group of formula $CH_2=C(CH_3)C(O)O-$.

"Alkoxy" or "alkoxyl" mean an alkyl group, as defined herein, attached to the parent molecular moiety through an oxygen atom. Representative alkoxy groups include methoxyl, ethoxyl, propoxyl, butoxyl, and the like.

"Alkyl" means a substituted and unsubstitued groups derived from a straight or branched chain saturated hydrocarbon by the removal of a single hydrogen atom. Alkyl groups are exemplified by methyl, ethyl, n- and iso-propyl, n-, sec-, iso- and tert-butyl, and the like.

"Allyl" means a group of formula $-CH_2CH=CH_2$. "Allyloxy" means a group of formula $-OCH_2CH=CH_2$.

"Amphoteric polymeric microparticle" means a cross linked polymeric microparticle containing both cationic substituents and anionic substitutents, although not necessarily in the same stoichiometric proportions. Representative amphoteric polymeric microparticles include terpolymers of nonionic monomers, anionic monomers and cationic monomers as defined herein. In an embodiment, the amphoteric polymeric microparticles have a higher than 1:1 anionic monomer/cationic monomer mole ratio.

"Ampholytic ion pair monomer" means the acid-base salt of basic, nitrogen containing monomers such as dimethylaminoethylacrylate (DMAEA), dimethylaminoethyl methacrylate (DMAEM), 2-methacryloyloxyethyldiethylamine, and the like and acidic monomers such as acrylic acid and sulfonic acids such as 2-acrylamido-2-methylpropane sulfonic acid, 2-methacryloyloxyethane sulfonic acid, vinyl sulfonic acid, styrene sulfonic acid, and the like.

"Anionic monomer" means a monomer as defined herein which possesses an acidic functional group and the base addition salts thereof. Representative anionic monomers include acrylic acid, methacrylic acid, maleic acid, itaconic acid, 2-propenoic acid, 2-methyl-2-propenoic acid, 2-acrylamido-2-methyl propane sulfonic acid, sulfopropyl acrylic acid and other water-soluble forms of these or other polymerizable carboxylic or sulphonic acids, sulphomethylated acrylamide, allyl sulphonic acid, vinyl sulphonic acid, the quaternary salts of acrylic acid and methacrylic acid such as ammonium acrylate and ammonium methacrylate, and the like. In an embodiment, anionic monomers include 2-acrylamido-2-methyl propanesulfonic acid sodium salt, vinyl sulfonic acid sodium salt and styrene sulfonic acid sodium salt. In an embodiment, the anionic monomer is 2-Acrylamido-2-methyl propanesulfonic acid sodium salt.

"Anionic polymeric microparticle" means a cross linked polymeric microparticle containing a net negative charge. Representative anionic polymeric microparticles include copolymers of acrylamide and 2-acrylamido-2-methyl propane sulfonic acid, copolymers of acrylamide and sodium acrylate, terpolymers of acrylamide, 2-acrylamido-2-methyl propane sulfonic acid and sodium acrylate and homopolymers of 2-acrylamido-2-methyl propane sulfonic acid. In an embodiment, the anionic polymeric microparticles are prepared from about 95 to about 10 mole percent of nonionic monomers and from about 5 to about 90 mole percent anionic monomers. In an embodiment, the anionic polymeric microparticles are prepared from about 95 to about 10 mole percent acrylamide and from about 5 to about 90 mole percent 2-acrylamido-2-methyl propane sulfonic acid.

"Aryl" means substituted and unsubstituted aromatic carbocyclic radicals and substituted and unsubstituted heterocyclic aromatic radicals including, but not limited to, phenyl, 1-naphthyl or 2-naphthyl, fluorenyl, pyridyl, quinolyl, thienyl, thiazolyl, pyrimidyl, indolyl, and the like.

"Arylalkyl" refers to an aryl group as defined herein, attached to the parent molecular moiety through an alkylene group. Representative arylalkyl groups include phenylmethyl, phenylethyl, phenylpropyl, 1-naphthylmethyl, and the like.

"Betaine-containing polymeric microparticle" means a cross linked polymeric microparticle prepared by polymerizing a betaine monomer and one or more nonionic monomers.

"Betaine monomer" means a monomer containing cationically and anionically charged functionality in equal proportions, such that the monomer is net neutral overall. Representative betaine monomers include N,N-dimethyl-N-acryloyloxyethyl-N-(3-sulfopropyl)-ammonium betaine, N,N-dimethyl-N-methacryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(2-carboxymethyl)-ammonium betaine, N,N-dimethyl-N-acryloxyethyl-N-(3-sulfopropyl)-ammonium betaine, N,N-dimethyl-N-acrylamidopropyl-N-(2-carboxymethyl)-ammonium betaine, N-3-sulfopropylvinylpyridine ammonium betaine, 2-(methylthio)ethyl methacryloyl-S-(sulfopropyl)-sulfonium betaine, 1-(3-sulfopropyl)-2-vinylpyridinium betaine, N-(4-sulfobutyl)-N-methyldiallylamine ammonium betaine (MDABS), N,N-diallyl-N-methyl-N-(2-sulfoethyl) ammonium betaine, and the like. In an embodiment, the betaine monomer is N,N-dimethyl-N-methacryloyloxyethyl-N-(3-sulfopropyl)-ammonium betaine.

"Cationic Monomer" means a monomer unit as defined herein which possesses a net positive charge. Representative cationic monomers include the quaternary or acid salts of dialkylaminoalkyl acrylates and methacrylates such as dimethylaminoethylacrylate methyl chloride quaternary salt (DMAEAMCQ), dimethylaminoethylmethacrylate methyl chloride quaternary salt (DMAEMMCQ), dimethylaminoethylacrylate hydrochloric acid salt, dimethylaminoethylacrylate sulfuric acid salt, dimethylaminoethyl acrylate benzyl chloride quaternary salt (DMAEABCQ) and dimethylaminoethylacrylate methyl sulfate quaternary salt; the quaternary or acid salts of dialkylaminoalkylacrylamides and methacrylamides such as dimethylaminopropyl acrylamide hydrochloric acid salt, dimethylaminopropyl acrylamide sulfuric acid salt, dimethylaminopropyl methacrylamide hydrochloric acid salt and dimethylaminopropyl methacrylamide sulfuric acid salt, methacrylamidopropyl trimethyl ammonium chloride and acrylamidopropyl trimethyl ammonium chloride; and N,N-diallyldialkyl ammonium halides such as diallyldimethyl ammonium chloride (DADMAC). In an embodiment, cationic monomers include dimethylaminoethylacrylate methyl chloride quaternary salt, dimethylaminoethylmethacrylate methyl chloride quaternary salt and diallyldimethyl ammonium chloride. In an embodiment, the cationic monomer is diallyldimethyl ammonium chloride.

"Cross linking monomer" means an ethylenically unsaturated monomer containing at least two sites of ethylenic unsaturation which is added to constrain the microparticle conformation of the polymeric microparticles of this invention. The level of cross linking used in these polymer microparticles is selected to maintain a rigid non-expandable microparticle configuration. Cross linking monomers according to this invention include both labile cross linking monomers and non-labile cross linking monomers.

"Emulsion," "microemulsion," and "inverse emulsion" mean a water-in-oil polymer emulsion comprising a polymeric microparticle according to this invention in the aqueous phase, a hydrocarbon oil for the oil phase and one or more water-in-oil emulsifying agents. Emulsion polymers are hydrocarbon continuous with the water-soluble polymers dispersed within the hydrocarbon matrix. The emulsion polymer are optionally "inverted" or converted into water-continuous form using shear, dilution, and, generally an inverting surfactant. See, U.S. Pat. No. 3,734,873, the entire content of which is incorporated herein by reference.

"Fluid mobility" means a ratio that defines how readily a fluid moves through a porous medium. This ratio is known as the mobility and is expressed as the ratio of the permeability of the porous medium to the viscosity for a given fluid.

$$\lambda = \frac{\kappa_x}{\eta_x}. \qquad 1$$

for a single fluid x flowing in a porous medium.

When more than one fluid is flowing the end point relative permeabilities must be substituted for the absolute permeability used in equation 1.

$$\lambda_x = \frac{\kappa_{rx}}{\eta_x}. \qquad 2$$

for a fluid x flowing in a porous medium in the presence of one or more other fluids.

When two or more fluids are flowing the fluid mobilities may be used to define a Mobility ratio.

$$M = \frac{\lambda_x}{\lambda_y} = \frac{\eta_y k_{rx}}{\eta_x k_{ry}}. \qquad 3$$

The mobility ratio is of use in the study of fluid displacement, for example in water flooding of an oil reservoir where x is water and y is oil, because the efficiency of the displacement process can be related to it. As a general principle at a mobility ratio of 1 the fluid front moves almost in a "plug flow" manner and the sweep of the reservoir is good. When the mobility of the water is ten times greater than the oil viscous instabilities, known as fingering, develop and the sweep of the reservoir is poor. When the mobility of the oil is ten times greater than the water the sweep of the reservoir is almost total.

"Hydrolytically labile silyl ether or silyl ester crosslinkers" means a cross-linking monomer as defined above which further comprises at least one —Si—O— group or at least one —Si—O(CO)— group, or a mixture thereof and at least two vinyl, vinyloxy, allyoxy, acryloxy, methacryloxy or allyl groups, or a mixture thereof.

"Ion-pair polymeric microparticle" means a cross linked polymeric microparticle prepared by polymerizing an ampholytic ion pair monomer and one more anionic or nonionic monomers.

"Labile cross linking monomer" means a cross linking monomer which can be degraded by certain conditions of heat and/or pH, after it has been incorporated into the polymer structure, to reduce the degree of crosslinking in the polymeric microparticle of this invention. The aforementioned conditions are such that they can cleave bonds in the "cross linking monomer" without substantially degrading the rest of the polymer backbone. Representative labile cross linking monomers include diacrylamides and methacrylamides of diamines such as the diacrylamide of piperazine, acrylate or methacrylate esters of di, tri, tetra hydroxy compounds including ethyleneglycol diacrylate, polyethyleneglycol diacrylate, trimethylopropane trimethacrylate, ethoxylated trimethylol triacrylate, ethoxylated pentaerythritol tetracrylate, and the like; divinyl or diallyl compounds separated by an azo such as the diallylamide of 2,2'-Azobis(isbutyric acid) and the vinyl or allyl esters of di or tri functional acids. In an embodiment, labile cross linking monomers include water soluble diacrylates such as PEG 200 diacrylate and PEG 400 diacrylate and polyfunctional vinyl derivatives of a polyalcohol such as ethoxylated (9-20) trimethylol triacrylate.

"Monomer" means a polymerizable allylic, vinylic or acrylic compound. The monomer may be anionic, cationic, nonionic or zwitterionic. In an embodiment, monomers comprise vinyl monomers. In another embodiment, monomers comprise acrylic monomers.

"Nonionic monomer" means a monomer as defined herein which is electrically neutral. Representative nonionic monomers include N-isopropylacrylamide, N,N-dimethylacrylamide, N,N-diethylacrylamide, dimethylaminopropyl acrylamide, dimethylaminopropyl methacrylamide, acryloyl morpholine, hydroxyethyl acrylate, hydroxypropyl acrylate, hydroxyethyl methacrylate, hydroxypropyl methacrylate, dimethylaminoethylacrylate (DMAEA), dimethylaminoethyl methacrylate (DMAEM), maleic anhydride, N-vinyl pyrrolidone, vinyl acetate and N-vinyl formamide. In an embodiment, nonionic monomers include acrylamide, N-methylacrylamide, N,N-dimethylacrylamide and methacrylamide. In another embodiment, the nonionic monomer is acrylamide.

"Non-labile cross linking monomer" means a cross linking monomer which is not degraded under the conditions of temperature and/or pH which would cause incorporated labile cross linking monomers and incorporated hydrolytic ally labile silyl ether ether or silyl ester crosslinking monomers to disintegrate. Non-labile cross linking monomer is added, in addition to the labile cross linking monomer, to control the expanded conformation of the polymeric microparticle. Representative non-labile cross linking monomers include methylene bisacrylamide, diallylamine, triallylamine, divinyl sulfone, diethyleneglycol diallyl ether, and the like. In an embodiment, the non-labile cross linking monomer is methylene bisacrylamide.

"Vinyl" means a group of formula —CH=CH$_2$. "Vinyloxy" means a group of formula —OCH=CH$_2$.

Highly cross linked expandable polymeric microparticles suitable for use in the composition and method of this invention are prepared by polymerizing monomers in the presence of hydrolytically labile silyl ether or silyl ester crosslinkers and optional labile crosslinkers and non-labile crosslinkers.

In an embodiment, the hydrolytically labile silyl ether or silyl ester crosslinkers and any labile crosslinkers are present in a combined amount of about 100 to about 200,000 ppm, based on total weight of monomer. In another embodiment, the silyl ether or silyl ester crosslinkers and any labile crosslinkers are present in a combined amount from about 1,000 to about 200,000 ppm. In another embodiment, the silyl ether or silyl ester crosslinkers and any labile crosslinkers are present in a combined amount from about 9,000 to about 200,000 ppm. In another embodiment, the silyl ether or silyl ester crosslinkers and any labile crosslinkers are present in a combined amount from about 9,000 to about 100,000 ppm. In another embodiment, the silyl ether or silyl ester crosslinkers and any labile crosslinkers are present in a combined amount from about 20,000 to about 60,000 ppm. In another embodiment, the silyl ether or silyl ester crosslinkers and any labile crosslinkers are present in a combined amount from about 500 to about 50,000 ppm. In another embodiment, the hydrolytically labile silyl ether or silyl ester crosslinkers and any labile crosslinkers are present in a combined amount of about 1,000 to about 20,000 ppm.

In an embodiment, the non-labile cross linker is present in an amount from about 0 to about 300 ppm, based on total weight of monomer. In another embodiment, the non-labile cross linker is present in an amount from about 0 to about 200 ppm. In another embodiment, the non-labile cross linker is present in an amount from about 0 to about 100 ppm. In another embodiment, the non-labile cross linker is present in an amount of from about 5 to about 300 ppm. In another embodiment, the non-labile cross linker is present in an amount of from about 2 to about 300 ppm. In another embodiment, the non-labile cross linker is present in an amount of from about 0.1 to about 300 ppm. In the absence of a non-labile cross linker, the polymer particle, upon complete scission of labile cross linker, is converted into a mixture of linear polymer strands. The particle dispersion is thereby changed into a polymer solution. This polymer solution, due to its viscosity, changes the mobility of the fluid in a porous medium. In the presence of a small amount of non-labile cross linker, the conversion from particles to linear molecules is incomplete. The particles become a loosely linked network but retain certain 'structure.' Such 'structured' particles can block the pore throats of porous media and create a blockage of flow.

In an aspect of the present disclosure, the polymeric microparticles of this disclosure are prepared using an inverse emulsion or microemulsion process to assure certain particle size range. In an embodiment, the unexpanded volume average particle size diameter of the polymeric microparticles is from about 0.05 to about 5,000 microns. In an embodiment, the unexpanded volume average particle size diameter of the polymeric microparticles is from about 0.1 to about 3 microns. In another embodiment, the unexpanded volume average particle size diameter of the polymeric microparticles is from 0.1 to about 1 microns. In yet another embodiment, the unexpanded volume average particle size diameter of the polymeric microparticles is from about 0.05 to about 50 microns.

Representative preparations of cross linked polymeric microparticles using microemulsion process are described in U.S. Pat. Nos. 4,956,400; 4,968,435; 5,171,808; 5,465,792 and 5,737,349.

In an inverse emulsion or microemulsion process, an aqueous solution of monomers and crosslinkers is added to a hydrocarbon liquid containing an appropriate surfactant or surfactant mixture to form an inverse monomer microemulsion consisting of small aqueous droplets dispersed in the continuous hydrocarbon liquid phase and subjecting the monomer microemulsion to free radical polymerization.

In addition to the monomers and crosslinkers, the aqueous solution may also contain other conventional additives including chelating agents to remove polymerization inhibitors, pH adjusters, initiators and other conventional additives.

The hydrocarbon liquid phase comprises a hydrocarbon liquid or mixture of hydrocarbon liquids. Saturated hydrocarbons or mixtures thereof are preferred. Typically, the hydrocarbon liquid phase comprises benzene, toluene, fuel oil, kerosene, odorless mineral spirits and mixtures of any of the foregoing.

Surfactants useful in the microemulsion polymerization process described herein include sorbitan esters of fatty acids, ethoxylated sorbitan esters of fatty acids, and the like or mixtures thereof. Preferred emulsifying agents include ethoxylated sorbitol oleate and sorbitan sesquioleate. Additional details on these agents may be found in McCutcheon's *Detergents and Emulsifiers*, North American Edition, 1980.

Polymerization of the emulsion may be carried out in any manner known to those skilled in the art. Initiation may be effected with a variety of thermal and redox free-radical initiators including azo compounds, such as azobisisobutyronitrile; peroxides, such as t-butyl peroxide; organic compounds, such as potassium persulfate and redox couples, such as sodium bisulfite/sodium bromate. Preparation of an aqueous product from the emulsion may be effected by inversion by adding it to water which may contain an inverting surfactant.

Polymeric microparticles cross linked with hydrolytically labile silyl ether or silyl ester crosslinkers may be further cross linked by internally cross linking polymer particles which contain polymers with pendant carboxylic acid and hydroxyl groups. The cross linking is achieved through the ester formation between the carboxylic acid and hydroxyl groups. The esterification can be accomplished by azeotropic distillation (U.S. Pat. No. 4,599,379) or thin film evaporation technique (U.S. Pat. No. 5,589,525) for water removal. For example, a polymer microparticle prepared from inverse emulsion polymerization process using acrylic acid, 2-hydroxyethylacrylate, acrylamide and 2-acrylamido-2-methylpropanesulfonate sodium as monomer is converted into cross linked polymer particles by the dehydration processes described above.

The polymeric microparticles are optionally prepared in dry form by adding the emulsion to a solvent which precipitates the polymer such as isopropanol, isopropanol/acetone or methanol/acetone or other solvents or solvent mixtures that are miscible with both hydrocarbon and water and filtering off and drying the resulting solid.

An aqueous suspension of the polymeric microparticles may be prepared by redispersing the dry polymer in water.

The hydrolytically labile silyl ether or silyl ester crosslinkers may be prepared by condensation of vinyl or allyl alcohols with alkoxysilanes, amiosilanes or halosilanes. Representative alkoxysilanes, amiosilanes or halosilanes include tetrapropoxysilane, tetramethoxysilane, 5-hexenyldimethylchlorosilane, 5-hexenyltrichlorosilane, allyldimethylchlorosilane, 10-undecenyltrichlorosilane, vinylmethyldichlorosilane, vinylmethyldiethoxysilane, vinyltrimethoxysilane, bis(p-aminophenoxy)dimethylsilane, 3-aminopropyltrimethoxysilane, and the like. For example, a hydrolytically labile multifunctional siloxane crosslinker can be readily prepared from tetrapropoxysilane by alcoholysis with excess allyl alcohol followed by distillation of propanol. Changing the molar ratio of the tetrapropoxysilane or vinyltrimethoxysilane to allyl alcohol can result in tri-functional or bi-functional crosslinkers.

Another type of hydrolytically labile siloxane includes poly(sily ester)s where the degradative properties can vary depending on the substituents attached to the silicone atoms and carbonyl groups of the silyl ester linkages. A representative silyl ester material that can be readily converted into a silyl ester crosslinker is (3-acryloxypropyl)dimethyl methoxysilane. Poly(silyl ester) crosslinkers may be prepared by transsilylation ester interchange reactions. The preparation of poly(silyl ester)s has been described in the literature. See, for example, M. Wang et al., Macromolecules, 2000, 33, 734.

In an embodiment, the hydrolytically labile silyl ether and silyl ester crosslinkers have formula $R_1R_2R_3Si[OSiR_4R_5]_nR_6$ wherein $R_1$, $R_2$, $R_3$, $R_4$, $R_5$ and $R_6$ are independently selected from vinyl, vinyloxy, allyoxy or allyl, alkyl, aryl, alkoxy, arylalkyl and —OC(O)$R_6$ where n is 0-100, provided that said crosslinkers comprise at least two vinyl, vinyloxy, allyoxy or allyl groups, or a mixture thereof.

In an embodiment, $R_1$, $R_2$, $R_4$ and $R_5$ are alkyl and $R_3$ and $R_6$ are independently selected from —CH$_2$—CH=CH$_2$ and —O—CH$_2$—CH=CH$_2$.

Upon injection into a subterranean formation, the polymeric microparticles flow through the zone or zones of relatively high permeability in the subterranean formation under increasing temperature conditions, until the composition reaches a location where the temperature or pH is sufficiently high to promote expansion of the microparticles.

Unlike conventional blocking agents such as polymer solutions and polymer gels that cannot penetrate far and deep into the formation, the composition of this invention, due to the size of the particles and low viscosity, can propagate far from the injection point until it encounters the high temperature zone.

Among other factors, the reduction in crosslinking density is dependent on the rate of cleavage of the hydrolytically labile silyl ether ether or silyl ester crosslinkers and any additional labile crosslinkers. In particular, hydrolytically labile silyl ether ether or silyl ester crosslinkers and different labile crosslinkers, have different rates of bond cleavage at different temperatures. The temperature and mechanism depend on the nature of the cross-linking chemical bonds. For example, It is known that silyl ether and silyl ester bonds are susceptible to hydrolysis under acidic and basic conditions. The degradation profile of these linkages can be tuned by varying the substiutents attached to the silicone and carbon atoms of the crosslinkers. Highly bulky substituents or substituents with different electronic character can alter the degradative properties of these labile linkages.

In addition to the rate of de-crosslinking, and without wishing to be bound to any theory, it is believed that the rate of particle diameter expansion also depends on the total amount of remaining crosslinking. We have observed that the particle expands gradually initially as the amount of crosslinking decreases. After the total amount of crosslinking passes below a certain critical density, the viscosity increases explosively. Thus, by proper selection of the hydrolytically labile silyl ether ether or silyl ester crosslinkers and additional labile crosslinkers, both temperature- and time-dependent expansion properties can be incorporated into the polymer particles.

The particle size of the polymer particles before expansion is selected based on the calculated pore size of the highest permeability thief zone. The crosslinker type and concentration, and hence the time delay before the injected particles begin to expand, is based on the temperature both near the injection well and deeper into the formation, the expected rate of movement of injected particles through the thief zone and the ease with which water can crossflow out of the thief zone into the adjacent, lower permeability, hydrocarbon containing zones. A polymer microparticle composition designed to incorporate the above considerations results in a better water block after particle expansion, and in a more optimum position in the formation.

An aspect of the present disclosure, therefore, is a method for diverting fluids injected into a subterranean formation to achieve improved hydrocarbon fluid recovery from the formation. In an embodiment, highly cross linked expandable polymeric microparticles having unexpanded volume average particle size diameters of about 0.05 to about 5,000 microns made with cross linking agent contents of about 100 to about 200,000 ppm of hydrolytically labile silyl ether or silyl ester crosslinkers and from 0 to about 300 ppm of non-labile crosslinkers may be injected into a subterranean formation to enhance oil recovery, to modify the permeability of the subterranean formation and to increase the mobilization and/or recovery rate of hydrocarbon fluids present in the formations.

There are many benefits that result from the use of the polymeric microparticles having hydrolyzable silyl ester or silyl ether crosslinkers. These crosslinkers provide copolymers having small particle size distributions and densities a conformation that is constrained such that the copolymer is able to efficiently traverse and propagate through the pore structure of a hydrocarbon fluid reservoir. As the polymeric microparticles traverse the reservoir formation and are exposed to water, increased temperatures and varying pH levels in the formation, the hydrolytically-labile cross links break, thereby allowing the polymeric microparticle to expand. Upon breakage of at least a portion of the cross links, the polymeric microparticles expand to form an expanded siloxane network wherein the size of the microparticles is greatly increased by absorption of the carrier fluid that is injected into the well. Typically, the carrier fluid is water. However, the skilled artisan will appreciate that the carrier fluid may be any carrier fluid known in the art and used for the recovery of hydrocarbon fluids from subterranean formations.

Moreover, the use of polymeric microparticles having hydrolytically labile silyl ether or silyl ester crosslinkers offers several benefits with respect to the activity or behavior of the microparticles. For example, in embodiments where the hydrolytically labile silyl ether or silyl ester crosslinkers comprise divinyl silyl ether crosslinkers having various alkyl lengths and structures, the crosslinkers allow for greater control of the rate of hydrolysis of the crosslinkers and, therefore, greater control of the expansion of the polymeric microparticles within the subterranean formation. Similarly, polymeric microparticles having divinyl silyl ester crosslinkers may also change the adhesive properties of the microparticles with respect to the subterranean formation. As such, the polymeric microparticles may undergo a chemical reaction when placed in contact with the subterranean formation such that charge of the microparticles allows the microparticles to adhere to the subterranean formation via molecular forces.

In an embodiment, the composition includes cross linked anionic, cationic, amphoteric, ion-pair or betaine-containing polymeric microparticles.

In an embodiment, the composition is in the form of an emulsion or aqueous suspension.

In an embodiment, at least one of the cross linked polymeric microparticles is anionic. The anionic polymeric microparticle may be prepared by free-radical polymerization from about 95 to about 10 mole percent of nonionic monomers and from about 5 to about 90 mole percent anionic monomers. The nonionic monomer may be acrylamide and the anionic monomer may be 2-acrylamido-2-methyl-1-propanesulfonic acid.

In an embodiment, at least one of the cross linked polymeric microparticles is cationic. The cationic polymeric microparticles may be prepared by free-radical polymerization of nonionic monomers with cationic monomers. In an embodiment, the cationic monomer may be diallyldimethyl ammonium chloride (DADMAC).

In an embodiment, the non-labile cross linker is methylene bisacrylamide.

The diameter of the expanded polymeric microparticles may be greater than one tenth of the controlling pore throat radius of the rock pores in the subterranean formation. Alternatively, the diameter of the expanded polymeric microparticles may be greater than one fourth of the controlling pore throat radius of the rock pores in the subterranean formation.

The ability of silyl ester or silyl ether crosslinkers to hydrolyze in the presence of water is also important because the hydrolyzed silyl ester or silyl ether will produce structured gels that aid in improving recovery of hydrocarbon fluids from subterranean formations. The expanded monomers that form the structure gel are designed to have a particle size distribution and physical characteristics such as, for example, the rheology of the expanded monomer dispersion or solution, that allow the expanded monomers to impede the flow of fluids that are injected into the subterranean formation. For example, the expanded monomers allow for improved wettability of the surface of the subterranean formation and, thus, allow for improved propagation into the pores of the formation. Upon deeper penetration into the formation, the expanded monomers are capable of blocking preferred fluid pathways in order to divert a chase fluid into less thoroughly swept zones of the reservoir. As such, the polymer application of the polymeric microparticles is able to provide improved recovery of hydrocarbon fluids from subterranean formations.

Accordingly, in another aspect of the present disclosure, methods of using the above-described compositions are provided. The methods are directed toward improving recovery of hydrocarbon fluids from a subterranean formation comprising injecting into the subterranean formation one or more of the compositions previously described herein, as well as variations and/or combinations thereof.

In an embodiment, the composition is added to injection water as part of a secondary or tertiary process for the recovery of hydrocarbon fluids from the subterranean formation. The injection water may be added to the subterranean formation at a temperature lower than the temperature of the subterranean formation. The injection water may also be added directly to a producing well.

The composition may be added to the injection water in any amount, based on polymer actives, effective to improve recovery of hydrocarbon fluids from the formation. For example, in an embodiment, from about 100 ppm to about 10,000 ppm of the composition, based on polymer actives, is added to the subterranean formation. In another embodiment, from about 500 ppm to about 1,500 ppm of the composition, based on polymer actives, is added to the subterranean formation. In yet another embodiment, from about 500 ppm to about 1,000 ppm of the composition, based on polymer actives, is added to the subterranean formation.

In an embodiment, the composition is used in a carbon dioxide and water tertiary recovery project.

In an embodiment, the composition is used in a tertiary oil recovery process, one component of which constitutes water injection.

In an embodiment, the subterranean formation is a sandstone or carbonate hydrocarbon reservoir.

The foregoing may be better understood by reference to the following examples, which are presented for purposes of illustration and are not intended to limit the scope of the present disclosure.

EXAMPLE 1

Sand Pack Test

This Example demonstrates that the polymeric microparticles of this invention can be propagated with a conformation constrained by the built-in reversible crosslinks and will expand in size when these break, to give a particle of suitable size to produce a substantial effect.

In the sand pack test, a 40 foot long sand pack of 0.25 inches internal diameter, made from degreased and cleaned 316 stainless steel tubing, is constructed in eight sections, fitted with pressure transducers, flushed with carbon dioxide gas and then placed in an oven and flooded with synthetic oil field injection water.

A dispersion of a representative polymeric microparticles is prepared in the synthetic injection water and injected into the pack to fill the pore volume. Pressure drops across the tube sections are monitored for signs of conformation change of the polymer particle as the reversible cross-links are hydrolysed. The "popping open" of the polymer particles is observed as a steep rise in the pressure drop. The sand pack test is described in detail in WO 01/96707.

The data for representative polymeric microparticles shows that the particles are able to travel through the first two sections of the sand pack without changing the RRF of the sections. However, particles in the last section, after accumulating a sufficient amount of residence time, have expanded and give a higher value of RRF. The higher RRF value is maintained after the injection fluid is changed from polymer dispersion to brine.

This experiment clearly demonstrates two aspects of the invention which are:

1. The polymeric microparticles with a conformation constrained by the built-in reversible crosslinks can be propagated through a porous media.

2. The microparticles will expand in size when crosslinks break, to give a particle of suitable size to produce a substantial effect, even in a high permeability porous medium.

EXAMPLE 2

Activation of the Polymeric Microparticles by Heat

As the particles expand in a medium of fixed volume, the volume fraction occupied by them increases. Consequently, the volume fraction of the continuous phase decreases. This decrease in free volume is reflected in an increase in the viscosity of the dispersion. Activation of the microparticles of present disclosure by heat can be demonstrated in a bottle test.

To carry out a bottle test, a dispersion containing 5000 ppm of the kernel particles is prepared in an aqueous medium (e.g., a synthetic brine). Dispersing of particles can be accomplished by vigorous stirring or by using a homogenizer. To prevent oxidative degradation of the expanding particles during monitoring, 1000 ppm sodium thiosulfate can be added to the mixture as an oxygen scavenger.

The bottles were placed in a constant temperature oven to age. Then, at a predetermined time, a bottle can be removed from the oven and cooled to 75 oF. The viscosity was measured at 75° F. using Brookfield LV No. 1 spindle at 60 rpm (shear rate 13.2 $sec^{-1}$).

Activation of the polymeric microparticles by heat can be demonstrated by monitoring the viscosity change of aqueous dispersions of particles aged at different temperature.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for improving recovery of hydrocarbon fluids from a subterranean formation comprising conditions of temperature and pH, the method comprising
    injecting into the subterranean formation a composition comprising highly cross linked expandable polymeric microparticles, the microparticles having an unexpanded volume average particle size diameter that is smaller than the pores of the subterranean formation and a crosslinking agent content of from 0 to about 300 ppm of non-labile crosslinking agents and from about 100 to about 200,000 ppm of labile crosslinking agents, wherein the labile crosslinking agents comprise one or more hydrolytically labile silyl ether or silyl ester crosslinkers, and wherein the particle size is constrined by cross-linking with said labile and non-labile crosslinkers and wherein the hydrolytically labile crosslinkers break under the conditions of temperature and pH in the subterranean formation to form expanded microparticles; and
    recovering hydrocarbon fluids from the subterranean formation.

2. The method of claim 1, wherein from about 100 ppm to about 10,000 ppm of the composition, based on polymer actives, is injected into the subterranean formation.

3. The method of claim 1, wherein the composition is added to injection water as part of a secondary or tertiary process for the recovery of hydrocarbon fluids from the subterranean formation.

4. The method of claim 1, wherein the composition is used in a carbon dioxide and water tertiary recovery project.

5. The method of claim 1, wherein the composition is used in a tertiary oil recovery process, one component of which constitutes water injection.

6. The method of claim 1, wherein the subterranean formation is a sandstone or carbonate hydrocarbon reservoir.

7. The method of claim 1 wherein the particle size of the polymeric microparticles before expansion is selected based on the calculated pore size of the highest permeability theif zone.

8. The method of claim 1 wherein the expanded polymeric microparticles impede the flow of an injected fluid in the pores of the subterranean formation.

* * * * *